US007353074B2

(12) United States Patent
Nickolaou et al.

(10) Patent No.: US 7,353,074 B2
(45) Date of Patent: Apr. 1, 2008

(54) PRODUCTION LOSS TRACKING SYSTEM

(75) Inventors: James N. Nickolaou, Clarkston, MI (US); Henry W. Baker, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 187 days.

(21) Appl. No.: 11/375,469

(22) Filed: Mar. 10, 2006

(65) Prior Publication Data
US 2007/0050071 A1    Mar. 1, 2007

Related U.S. Application Data

(60) Provisional application No. 60/713,069, filed on Aug. 31, 2005.

(51) Int. Cl.
*G06F 19/00* (2006.01)
(52) U.S. Cl. ......................................... 700/108; 700/80
(58) Field of Classification Search ................ 700/108, 700/111, 99, 96, 80, 110; 702/182, 185
See application file for complete search history.

(56) References Cited

U.S. PATENT DOCUMENTS 5,327,349 A * 7/1994 Hoste ......................... 700/110
6,128,543 A * 10/2000 Hitchner ..................... 700/108
6,381,508 B1 * 4/2002 Marrie ......................... 700/96
7,212,876 B2 * 5/2007 Blumenfeld et al. ........ 700/108
2006/0085084 A1 * 4/2006 Nickolaou et al. ............ 700/12

OTHER PUBLICATIONS

Alden et al. "General Motors Increases Its Production Throughput" Interfaces vol. 36, No. 1, Jan.-Feb. 2006, pp. 6-25.*

* cited by examiner

*Primary Examiner*—Leo Picard
*Assistant Examiner*—Steven R. Garland

(57) ABSTRACT

A production loss tracking system for a manufacturing system includes a collection module, an event module, and a report module. The collection module collects a processing status from a plurality of processing stations. The event module forecasts an upstream production loss event for a first of the processing stations that is upstream from a second of the processing stations that experienced a production loss event when the processing status indicates the production loss event. The event module forecasts a downstream production loss event for a third of the processing stations that is downstream from the second of the processing stations that experienced the production loss event when the processing status indicates the production loss event. The report module communicates with the event module and generates a report indicating the upstream production loss event, the downstream production loss event, and the production loss event.

30 Claims, 4 Drawing Sheets

# PRODUCTION LOSS TRACKING SYSTEM

CROSS-REFERENCE TO RELATED APPLICATIONS

This application claims the benefit of U.S. Provisional Application No. 60/713,069, filed on Aug. 31, 2005. The disclosure of the above application is incorporated herein by reference.

FIELD OF THE INVENTION

The present invention relates to manufacturing systems, and more particularly to identifying and tracking causes of throughput losses within a manufacturing system.

BACKGROUND OF THE INVENTION

With current advancements in technology, many types of processes can now be automated. Automated systems are becoming increasingly pervasive in a variety of business enterprises. One area of automation can be found in the manufacturing industry. For example, manufacturing enterprises are enhancing their operations by installing automated machinery for producing finished goods as well as unfinished goods such as subassemblies.

Business enterprises, however, are often faced with significant challenges when it comes to maintaining their automated equipment and minimizing downtime. Operational issues should be identified and addressed in an efficient and timely manner. Many factors contribute to loss of production of the enterprise on a daily basis. Factors may include machine breakdowns, tardy personnel, slow working machinery and personnel, process rejects, automated stations working beyond their expected cycle time, and blocking and starving production lines.

Identifying issues and tracking their progress is not an easy task. In some cases, the necessary information may simply not be available from the system equipment, such as in the case of outdated manufacturing systems. In the case of newer systems, the information may be available, however, due to its sheer volume, may be difficult to interpret, filter, or prioritize.

Automated collection systems have been developed to capture issues of the business enterprise. Collection systems capture and store data pertaining to operations of the enterprise, faults that occur for each operation, a number of incidences per loss event, and a corresponding loss event for the number of incidences. For large enterprises, the data in raw form can be overwhelming. Without a method of organizing, prioritizing, and tracking the data, a business enterprise may not be able to improve the efficiency of the business. Further a business enterprise may not be able to improve the uptime performance of the enterprise.

SUMMARY OF THE INVENTION

A production loss tracking system for a manufacturing system according to the present invention includes a collection module, an event module, and a report module. The collection module collects a processing status from a plurality of processing stations. The event module forecasts an upstream production loss event for a first of the processing stations that is upstream from a second of the processing stations that experienced a production loss event when the processing status indicates the production loss event. The event module forecasts a downstream production loss event for a third of the processing stations that is downstream from the second of the processing stations that experienced the production loss event when the processing status indicates the production loss event. The report module communicates with the event module and generates a report indicating the upstream production loss event, the downstream production loss event, and the production loss event.

In other features, the event module receives a system configuration of the manufacturing system from a storage module and forecasts the upstream and downstream production loss events based on the system configuration. The event module generates an upstream object in memory to track the upstream production loss event and a downstream production loss object to track the downstream production loss event.

In still other features, the upstream object includes a root cause location attribute, a root cause duration attribute, an upstream location attribute, and an upstream destination attribute. The root cause attribute indicates the second of the processing stations that experienced the production loss event. The root cause duration attribute indicates a period of the production loss event of the second of the processing stations. The upstream location attribute indicates an upstream location from the second of the processing stations that is experiencing the upstream production loss event. The upstream destination attribute indicates one of the processing stations that is upstream from the second of the processing stations that is forecasted to experience the upstream production loss event.

In still more features, the downstream object includes the root cause location attribute, the root cause duration attribute, a downstream location attribute, and a downstream destination attribute. The downstream location attribute indicates a downstream location from the second of the processing stations that is experiencing the downstream production loss event. The downstream destination attribute indicates one of the processing stations that is downstream from the second of the processing stations that is forecasted to experience the downstream production loss event.

In yet other features, the production loss tracking system includes a timer that decrements from the root cause duration. The event module removes the upstream and downstream objects from memory when the timer expires. The event module stores the upstream object in the storage module and removes the upstream object from memory when the upstream production loss event has completely propagated through the manufacturing system. The event module stores the downstream object in the storage module and removes the downstream object from memory when the downstream production loss event has completely propagated through the manufacturing system. The event module determines that the upstream production loss event has completely propagated through the manufacturing system based on the timer and the upstream location attribute. The event module determines that the downstream production loss event has completely propagated through the manufacturing system based on the timer and the downstream location attribute.

In yet more features, the event module includes an error module that determines a confidence level of the upstream and downstream production loss data. The confidence level is based on a total system time and a time required for a part to completely traverse the manufacturing system. The confidence level is also based on a total number of pallets in the manufacturing system and a number of pallets the manufacturing system has processed. A graphical user interface displays either the report, the confidence level, or both the report and the confidence level. The report is either a real time report, a historical report, or both. The report module also includes a playback module that plays back the historical report on the graphical user interface in a real time format.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
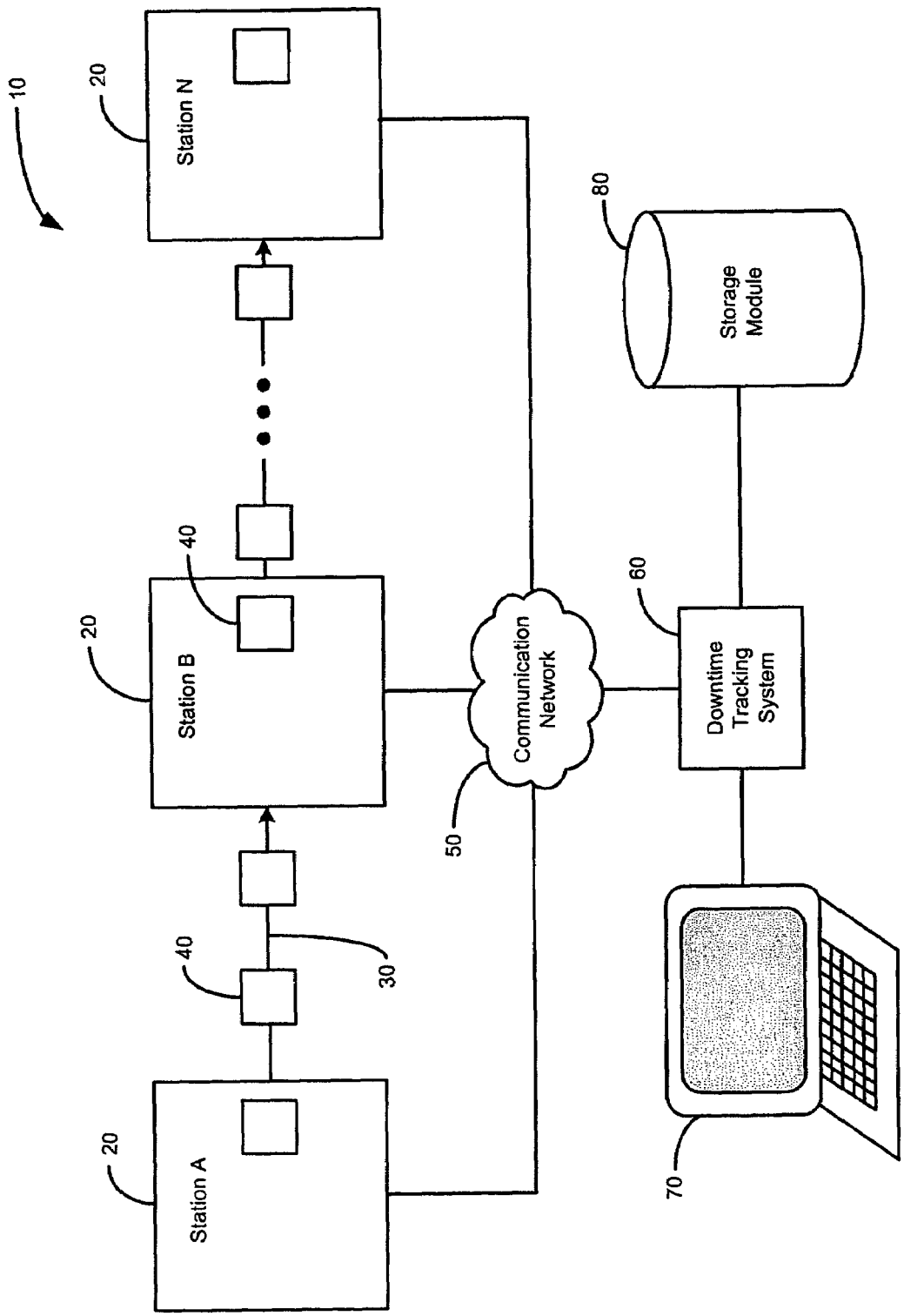
FIG. 1 is a functional block diagram of a manufacturing system utilizing a production loss tracking system.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary manufacturing system 10 is shown. The manufacturing system 10 includes N processing stations 20 as illustrated by processing stations A, B, and N. Although three processing stations 20 are illustrated it can be appreciated that more or less processing stations may be used in accordance with the present invention. The processing stations 20 process parts (not shown) at varying rates. The processing stations 20 are connected by a conveyor 30. Pallets 40 transfer the parts to be processed along the conveyor 30 to the appropriate processing station 20. The pallets 40 may move freely between each station and the travel time between stations may vary depending on the length of the conveyor 30 section and the rate that the pallet 40 moves between processing stations 20. Each processing station 20 communicates with a communication network 50. The communication network 50 may be any type or combination of known networks including, but not limited to, a wide area network (WAN), a local area network (LAN), a wireless LAN (WLAN), a global network (e.g., Internet), a virtual private network (VPN), and an intranet.

A processing status of each processing station 20 is communicated to a production loss tracking system 60 through the communication network 50. The production loss tracking system 60 tracks a production loss of each processing station 20 and the effect of the production loss on the entire manufacturing system 10. The processing status may include, but is not limited to, an autocycle, an overcycle, a down, a starved, a blocked, an undefined starved, an undefined blocked condition, and a reject processing condition.

The autocycle condition is when the processing station 20 is ready to process a part or is currently processing a part in an automatic cycle mode. The overcycle condition is when the processing station 20 has taken longer than a specified time to process the part. The down condition is when the processing station 20 has a fault and is unable to process parts. The starved condition is when the processing station 20 is not receiving parts to process but is ready to process parts. The blocked condition is when the processing station 20 cannot produce anymore parts because the downstream processing station 20 station is not capable of receiving them. The undefined starved condition occurs when the processing station 20 experiences the starved condition when the production loss tracking system 60 did not expect the starved condition to occur. The undefined blocked condition occurs when the processing station 20 experiences the blocked condition when the production loss tracking system 60 did not expect the blocked condition to occur. The reject processing condition occurs when the processing station 20 has difficulty processing a part and must back out in order to restart processing the part.

A graphical user interface (GUI) 70 communicates with the production loss tracking system 60 and displays real-time tracking information from the production loss tracking system 60. The GUI may be a personal computer, a laptop computer, a monitor, or any other type of graphical display device. A storage module 80 stores a system configuration of the manufacturing system 10 that includes, but is not limited to, the sequence of the processing stations 20, the rate of travel between processing stations 20, the maximum number of pallets 40 that are allowable between the processing stations 20, and a processing rate of the processing stations 20. The storage module 80 may also store historical production loss data acquired by the production loss tracking system 60.

Figure 2:
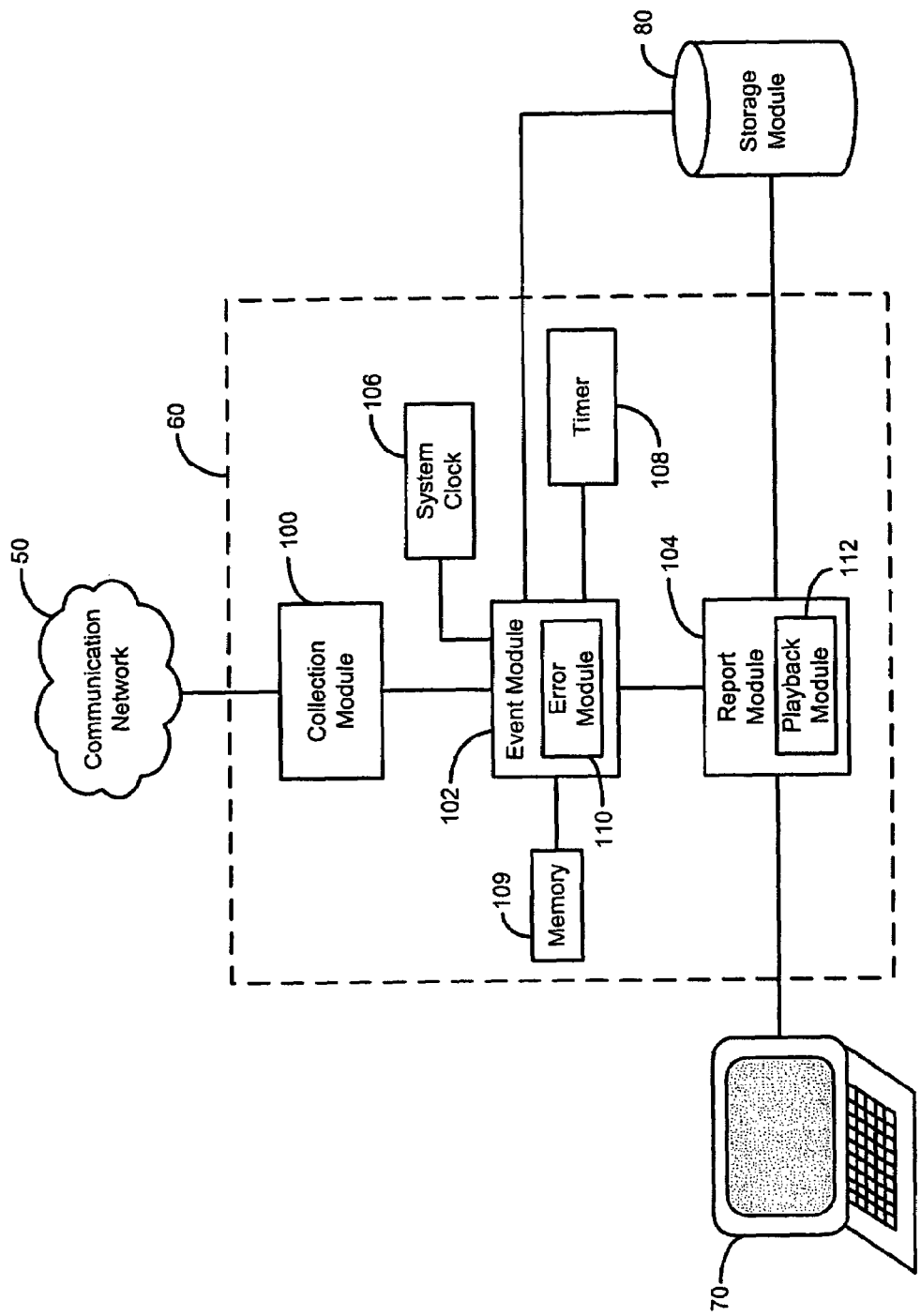
FIG. 2 is a functional block diagram of the production loss tracking system according to the present invention.

Referring now to FIG. 2, the production loss tracking system 60 includes a collection module 100, an event module 102, a report module 104, a system clock 106, and a timer 108. The collection module 100 communicates with the communication network 50 and collects the processing status generated by the processing stations 20. The event module 102 communicates with the collection module 100, the report module 104, the system clock 106, the timer 108, and the storage module 80.

When an event causes a production loss to the manufacturing system 10, the event module 102 generates an object in memory 109 containing information regarding the event. The object contains information such as, but not limited to, an event type, an event start time, a root cause event, a root cause location, a root cause time, a root cause duration, a remaining life, a current location, a current destination, a next station time, and a previous station time.

The event type may be the overcycle, down, blocked, starved, undefined blocked, or undefined starved condition. The event start time is a time as determined by the system clock 106 that the event occurs.

The root cause event refers to the event that caused the production loss event. More specifically, the root cause event may be the down, overcycle, or a side starved condition. The side starved condition is when the processing machine 20 cannot process parts due to an interruption of side material flow unassociated with upstream or downstream processing stations 20. The root cause location is the processing station 20 that experienced the root cause production loss event. The root cause time is a time as determined by the system clock 106 that the production loss event occurs due to the root cause event. The root cause duration is a total time of the root cause event that caused the production loss event. When the root cause event occurs, the event module 102, uses the system clock 106 to time the root cause duration. The remaining life is an amount of time that the production loss event may affect the manufacturing system 10 and is initially the same as the root cause duration. When the root cause event no longer exists, the event module 102 uses the timer 108 to countdown the remaining life to zero.

The current location is the processing station 20 that is currently experiencing the production loss effect of the root cause event. In the starved condition, the current destination is the processing station 20 that is downstream of the current location. In the blocked condition, the current destination is the processing station 20 that is upstream of the current location. The next station time is an estimated time that the production loss event may affect the processing stations 20 downstream of the root cause location. The previous station time is an estimated system time that the production loss event may affect the processing station 20 upstream of the root cause location.

Each object that is created in memory 109 has a limited life until removed from memory 109. More specifically, each object remains in memory 109 until the remaining life associated with the object counts down to zero or until the effect on the manufacturing system 10, as defined by the remaining life and current location, completely propagates through the manufacturing system 10. When the effects of the root cause event have completely propagated through the manufacturing system 10, the event module 102 saves the object in the storage module 80 before removing it from memory 109. In some embodiments, the object may be removed from memory 109 when the effect propagates through a user defined subsection of the manufacturing system 10.

The event module 102 includes an error module 110 that reports a confidence level of production loss data. When the manufacturing system 10 is first initialized gaps in pallet flow may already exist. Therefore, when the manufacturing system 10 is initialized, production loss events such as blocked and staved conditions cannot be attributed to any specific processing station 20. The longer the manufacturing system 10 runs the more accurate the production loss event data will become. The level of confidence may be based on a total system time that the manufacturing system 10 has been running versus a total manufacturing time that the part requires to traverse the entire manufacturing system. The level of confidence may also be based on a total number of pallets 40 the manufacturing system 10 has versus a number of pallets 40 the manufacturing system has processed. Additional variables that may be used to determine the level of confidence include, but are not limited to, location of the part within the manufacturing system 10, processing time at each station 20 required to process the part, and time required to transfer the part between processing stations.

The report module 104 provides real-time and historical reports that may be displayed on the GUI 70 of events that cause a loss of production to the manufacturing system 10. The reports may be prioritized by loss event. More specifically, the reports may be prioritized to display loss events from greatest to smallest impact on the manufacturing system 10. In addition, a user may configure the report to view loss events from a perspective of any of the processing stations 20 and then prioritize the report with respect to the perspective of the selected processing station 20. The real-time report includes, but is not limited to, a list of estimated time intervals that the production loss event may affect the processing stations 20, the root cause event, and the confidence level of production loss data. The historical report includes, but is not limited to, the root cause event, the root cause location, the root cause time, the root cause duration, and the confidence level of production loss data. The report module 104 may also include a playback module 112 that plays back a historical account of the behavior of the manufacturing system 10 in a real time format allowing for future analysis of the production loss event.

Figure 3:
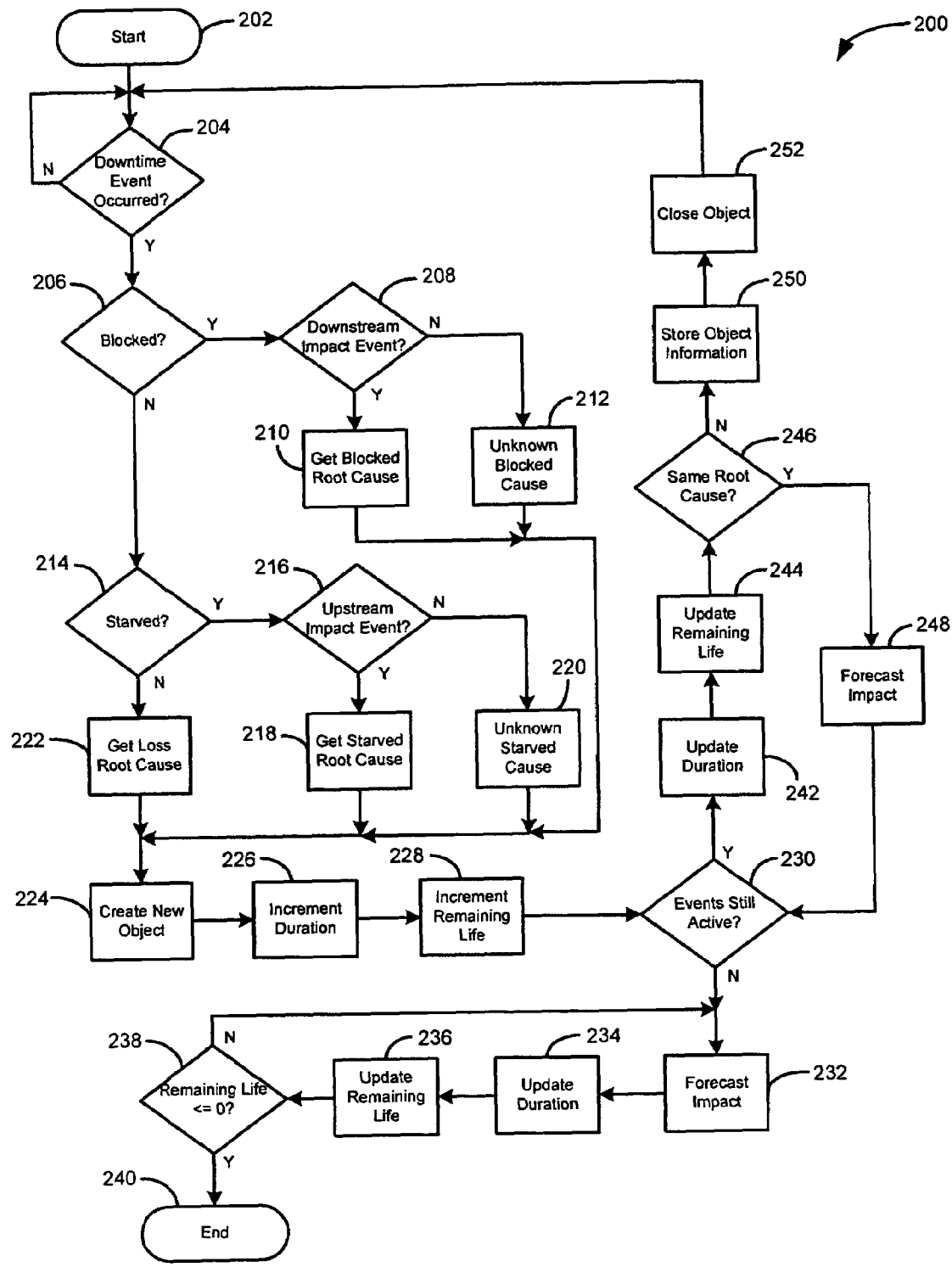
FIG. 3 is a flowchart illustrating exemplary steps taken by the production loss tracking system.

Referring now to FIG. 3, the production loss tracking system 60 implements steps generally shown at 200 for each production loss event that may occur at each processing station 20. The process starts in step 202 when the production loss tracking system 60 is initialized. The production loss tracking system 60 is typically initialized when the manufacturing system 10 is initialized. In step 204, the event module 102 determines whether a production loss event has occurred. If a production loss event has not occurred, the process returns to step 202. If a production loss event has occurred, the event module 102 determines whether the production loss event is the blocked condition in step 206. Although the blocked condition is given priority over the starved condition in this example, some embodiments may allow a user to define which condition is given priority. If the production loss event is the blocked condition, control determines whether the production loss event was caused by an event downstream of the processing station 20 in step 208. If the production loss event was caused by a downstream event, the event module 102 determines the root cause event of the downstream event in step 210. If the production loss event was not caused by a downstream event, the event module 102 determines that the processing station 20 experienced the unknown blocked condition in step 212.

If the production loss event is not determined to be the blocked condition in step 206, the event module 102 determines whether the production loss event is the starved condition in step 214. In step 216, the event module 102 determines whether the production loss event was caused by an upstream event. If the production loss event was caused by an upstream event, the event module 102 determines the root cause event of the production loss event in step 218. If the production loss event was not caused by an upstream event, the event module 102 determines that the processing station 20 experienced the unknown starved condition in step 220.

If the production loss event is not determined to be the starved condition in step 214, the event module 102 determines the root cause event of the production loss event in step 222. In step 224, the event module 102 creates an object of the production loss event and an object for every possible event that may propagate to upstream and downstream processing stations 20. Once the objects have been created, the event module 102 begins to time the duration of the production loss event using the system clock 106 in step 226. In step 228, the event module 102 begins to time the remaining life of the production loss event using the system clock 106.

In step 230, the event module 102 determines whether the production loss events are still active for each processing station 20. If the production loss events are not still active, the event module 102 forecasts the effects of the production loss event on the manufacturing system 10 in step 232. The forecasted effects may be displayed in real time on the GUI 70. In step 234, the event module 102 updates the duration of the production loss event. More specifically, if the root cause event is no longer active, the event module 102 stops timing the duration of the production loss event. However, if the root cause event is still active the event module 102 continues timing the production loss event. In step 236, the event module 102 updates the remaining life. More specifically, if the root cause event still exists, the event module 102 continues timing the remaining life. However, if the root cause event does not exist, the event module 102 begins to decrement the remaining life using the timer 108. In step 238, the event module 102 determines whether the remaining life has decremented to a value less than or equal to zero. If the remaining life has decremented to a value less than or equal to zero, the process ends in step 240. However, if the remaining life is greater than zero, the process returns to step 232.

If the event module 102 determines that the events are still active in step 230, the duration of the production loss is updated in step 242 and the remaining life is updated in step 244. As previously discussed, if the root cause event still exists, the event module 102 continues timing the duration and remaining life. However, if the root cause event does not exist, the event module 102 stops timing the duration and begins to decrement the remaining life.

In step 246, the event module 102 determines whether the production loss event has the same root cause event. If the production loss event has the same root cause event, the event module 102 forecasts the effect of the production loss event on the manufacturing system 10 in step 248 and the process returns to step 230. As previously discussed, the forecasted effects of the manufacturing system 10 may be displayed in real time on the GUI 70. If the production loss event does not have the same root cause event, the event module 102 stores the object in the storage module 80 in step 250. The object is then removed from memory 109 in step 252 and returns to step 202.

Figure 4:
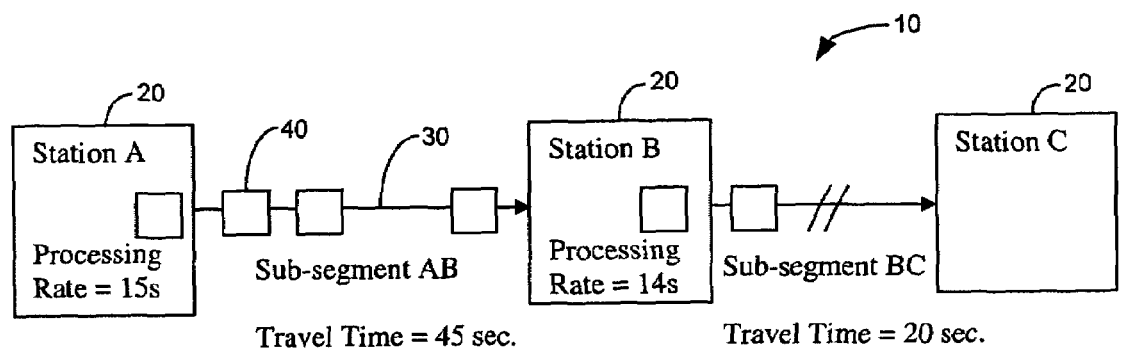
FIG. 4 is a functional block diagram illustrating an exemplary starved condition of the manufacturing system.
Figure 5:
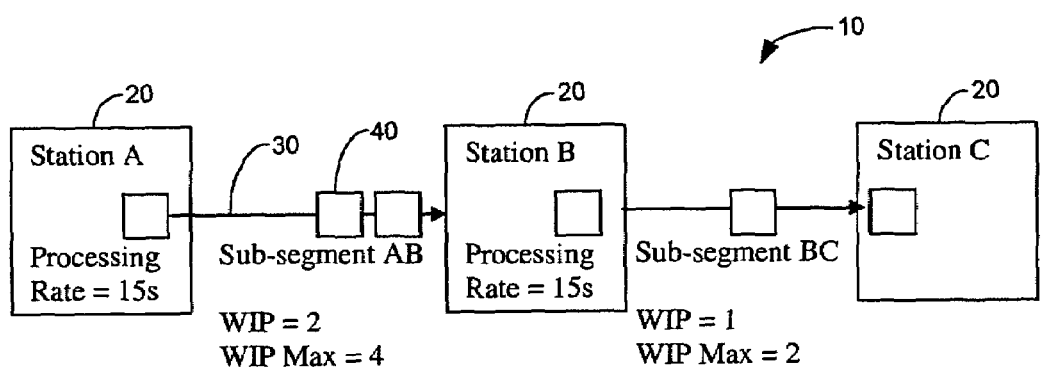
FIG. 5 is a functional block diagram illustrating an exemplary blocked condition of the manufacturing system.

In order to fully appreciate the production loss tracking system 60 FIGS. 4-5 are provided to illustrate exemplary production loss events. The events include production loss affecting downstream processing stations 20 and production loss affecting upstream processing stations 20.

Referring now to FIG. 4, an exemplary starved condition is illustrated in the manufacturing system 10. The pallets 40 transport parts to be processed between the processing stations 20. An exemplary starved condition will be discussed in detail to further explain the production loss tracking system 60.

Assume that Station A experiences the down condition at 10:00 AM and communicates the event to the collection module 100 through the communication network 50. The event module 102 creates object1 where the event type is down, the event start time is 10:00 AM, the root cause event is down, root cause location is Station A, the root cause time is 10:00 AM, the current location is Station A, the current destination is Station B, and the next station time is 10:00:45. The event module 102 determines the current destination from reading the system configuration stored in the storage module 80. The next station time is the system time plus an estimated time for the interruption to reach the next station. The estimated travel time to the next station is also stored in the storage module 80. As shown in FIG. 4, the next station is Station B and the estimated travel time is 45 seconds. Therefore, the next station time is 10:00:00+00:00:45=10:00:45.

At 10:00:40 AM the down condition of Station A ends. The root cause duration, the remaining life, and the current location are updated in object1. More specifically, the root cause duration is 40 seconds (10:00:40–10:00:00). The remaining life is also 40 seconds and then begins to decrement. The current location is Sub-segment AB. When the next station time equals the system time for object1, the current location is changed from Sub-segment AB to Station B and the current destination is changed from Station B to Station C.

Since the production loss event occurred at the end of a normal operating cycle for Station A, the travel time for the pallet 40 moving from Station A to Station B is 45 seconds. Therefore, Station B should experience the starved condition between 10:00:45 and 10:01:25.

Assume that Station B reports a starved condition at 10:00:50 AM causing object2 to be created. Object2 is used to carry forward the starved component associated with Station B that is attributed to the down condition at Station A. In object2, the event type is starved, the event start time is 10:00:50 AM, the root cause event is down (from object1), the root cause location is Station A (from object1), the root cause start is 10:00 AM (from object1), the root cause duration is 40 seconds (from object1), the current location is Station B, the current destination is Station C, and the next station time is 10:01:24 (10:00:50+20 second Sub-segment BC travel time+14 second cycle time at Station B). The event module 102 times the duration of the starved event using the system clock 106.

At 10:01:20 AM, the starved condition ends and the remaining life and current location of object2 are updated. More specifically, the remaining life is 30 seconds, which is the total amount of production loss that occurred to Station B between 10:00:45 and 10:01:25 and the current location is Sub-segment BC. If another event does not occur before the current time is greater than a sum of the root cause start and the root cause duration of object1, then object1 is removed from memory 109 and the total amount of production loss at Station B that can be attributed to Station A is 30 seconds.

Since the current location is now Sub-segment BC, Station C will anticipate a starved condition to occur within a time window established by the remaining life of 30 seconds and the travel time between Station B and Station C.

Referring now to FIG. 5, an exemplary blocked condition is illustrated in the manufacturing system 10. The pallets 40 transport product to be processed between the processing stations 20. Whenever the down condition event (or any other type of loss event that interrupts the processing station 20) occurs, there is also an effect of the down condition propagated upstream creating the blocked condition. Thus, an exemplary blocked condition will be discussed in detail to further explain the production loss tracking system 60.

Assume Station B enters the down condition at 10:00 AM. The event module 102 creates object1 to determine the potential impact of the production loss event on upstream processing stations 20. The event type is down, the event start time is 10:00 AM, the root cause event is down, the root cause location is Station B, the root cause start is 10:00 AM, and the previous station time is 10:00:45. The previous station time may be determined by reading the processing station 20 cycle rate, the amount of work in process (WIP) between processing stations 20, and the maximum amount of possible WIP between processing stations from the storage module 80. In this example, the previous station time is system time+((WIP Max−WIP)*previous station cycle time+previous station cycle time (10:00 AM+((4−2)*00:00:15+00:00:15=10:00:45). The previous station time represents a time that Station A may block as a result of Station B experiencing the down condition.

Assume that Station A experiences the blocked condition at 10:00:50. The event module 102 creates object2 where the event type is blocked, the event start time is 10:00:40 AM, the root cause event is down (from object1), the root cause location is Station B (from object1), and the root cause start is 10:00 AM (from object 1). Since Station A experienced the blocked condition as a result of the down condition event of Station B, which is still in the down condition, object1 is removed from memory 109 and object2 is used to carry forward the production loss event.

Assume that the down condition of Station B ends at 10:01:05. The root cause duration and the remaining life are updated. More specifically, the root cause duration is 65 seconds and the remaining life is 65 seconds.

Assume that the blocked condition of Station A ends at 10:01:15. The actual amount of time that Station A was experiencing the blocked condition due to Station B is 25 seconds (10:01:15−10:00:50). Since the event did not propagate beyond Station A before Station B transitioned out of the blocked condition, object2 may be saved in the storage module and then removed from memory 109.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A production loss tracking system for a manufacturing system, comprising:
    a collection module that collects a processing status from a plurality of processing stations;
    an event module that forecasts an upstream production loss event for a first of said processing stations that is upstream from a second of said processing stations and a downstream production loss event for a third of said processing stations that is downstream from said second of said processing stations when said processing status indicates that said second of said processing stations experienced a production loss event; and
    a report module that communicates with said event module and that generates a report indicating said upstream production loss event, said downstream production loss event, and said production loss event.

2. The production loss tracking system of claim 1 wherein said event module receives a system configuration of the manufacturing system from a storage module and forecasts said upstream production loss event and said downstream production loss event based on said system configuration.

3. The production loss tracking system of claim 2 wherein said event module generates an upstream object in memory to track said upstream production loss event and a downstream object in memory to track said downstream production loss event.

4. The production loss tracking system of claim 3 wherein said upstream object comprises:
    a root cause location attribute that indicates said second of said processing stations that experienced said production loss event;
    a root cause duration attribute that indicates a period of said production loss event;
    an upstream location attribute that indicates an upstream location from said second of said processing stations that is experiencing said upstream production loss event; and
    an upstream destination attribute that indicates one of said processing stations that is upstream from said second of said processing stations and that is forecasted to experience said upstream production loss event.

5. The production loss tracking system of claim 4 wherein said downstream object comprises:
    said root cause location attribute;
    said root cause duration attribute;
    a downstream location attribute that indicates a downstream location from said second of said processing stations that is experiencing said downstream production loss event; and
    a downstream destination attribute that indicates one of said processing stations that is downstream from said second of said processing stations and that is forecasted to experience said downstream production loss event.

6. The production loss tracking system of claim 5 further comprising a timer that decrements from said root cause duration attribute.

7. The production loss tracking system of claim 6 wherein said event module removes said upstream object and said downstream object from memory when said timer expires.

8. The production loss tracking system of claim 6 wherein:
    said event module stores said upstream object in said storage module and removes said upstream object from memory when said upstream production loss event has completely propagated through the manufacturing system; and
    said event module stores said downstream object in said storage module and removes said downstream object from memory when said downstream production loss event has completely propagated through the manufacturing system.

9. The production loss tracking system of claim 8 wherein said event module determines that:
    said upstream production loss event has completely propagated through the manufacturing system based on said timer and said upstream location attribute; and
    said downstream production loss has completely propagated through the manufacturing system based on said timer and said downstream location attribute.

10. The production loss tracking system of claim 9 wherein said event module includes an error module that determines a confidence level of said upstream production loss event and downstream production loss event.

11. The production loss tracking system of claim 10 wherein said confidence level is based on a total system time and a time required for a part to completely traverse the manufacturing system.

12. The production loss tracking system of claim 10 wherein said confidence level is based on a total number of pallets in the manufacturing system and a number of pallets the manufacturing system has processed.

13. The production loss tracking system of claim 10 wherein a graphical user interface displays at least one of said report and said confidence level.

14. The production loss tracking system of claim 13 wherein said report is at least one of a real time report and a historical report.

15. The production loss tracking system of claim 14 wherein said report module includes a playback module that plays back said historical report on said graphical user interface in a real time format.

16. A method to track production loss for a manufacturing system, comprising:
- collecting a processing status from a plurality of processing stations;
- forecasting an upstream production loss event for a first of said processing stations that is upstream from a second of said processing stations and a downstream production loss event for a third of said processing stations that is downstream from said second of said processing stations when said processing status indicates that said second of said processing stations experienced a production loss event; and
- generating a report indicating said upstream production loss event, said downstream production loss event, and said production loss event.

17. The method of claim 16 further comprising:
- receiving a system configuration of the manufacturing system from a storage module; and
- forecasting said upstream production loss event and said downstream production loss event based on said system configuration.

18. The method of claim 17 further comprising generating an upstream object in memory to track said upstream production loss event and a downstream object in memory to track said downstream production loss event.

19. The method of claim 18 wherein said upstream object comprises:
- a root cause location attribute that indicates said second of said processing stations that experienced said production loss event;
- a root cause duration attribute that indicates a period of said production loss event;
- a upstream location attribute that indicates an upstream location from said second of said processing stations that is experiencing said upstream production loss event; and
- an upstream destination attribute that indicates one of said processing stations that is upstream from said second of said processing stations and that is forecasted to experience said upstream production loss event.

20. The method of claim 19 wherein said downstream object comprises:
- said root cause location attribute;
- said root cause duration attribute;
- a downstream location attribute that indicates a downstream location from said second of said processing stations that is experiencing said downstream production loss event; and
- a downstream destination attribute that indicates one of said processing stations that is downstream from said second of said processing stations and that is forecasted to experience said downstream production loss event.

21. The method of claim 20 further comprising providing a timer to decrement said root cause duration attribute.

22. The method of claim 21 further comprising removing said upstream object and downstream object from memory when said timer expires.

23. The method of claim 21 further comprising:
- storing said upstream object in said storage module and removing said upstream object from memory when said upstream production loss event has completely propagated through the manufacturing system; and
- storing said downstream object in said storage module and removing said downstream object from memory when said downstream production loss event has completely propagated through the manufacturing system.

24. The method of claim 23 further comprising:
- determining that said upstream production loss event has completely propagated through the manufacturing system based on said timer and said upstream location attribute; and
- determining that said downstream production loss event has completely propagated through the manufacturing system based on said timer and said downstream location attribute.

25. The method of claim 24 further comprising determining a confidence level of said upstream production loss event and said downstream production loss event.

26. The method of claim 25 wherein said confidence level is based on a total system time and a time required for a part to completely traverse the entire manufacturing system.

27. The method of claim 25 wherein said confidence level is based on a total number of pallets in the manufacturing system and a number of pallets the manufacturing system has processed.

28. The method of claim 25 further comprising displaying at least one of said report and said confidence level.

29. The method of claim 28 wherein said report is at least one of a real time report and a historical report.

30. The method of claim 29 further comprising displaying said historical report in a real time format.

* * * * *